United States Patent [19]
Xu et al.

[11] Patent Number: 5,657,140
[45] Date of Patent: Aug. 12, 1997

[54] NORMALLY WHITE TWISTED NEMATIC LCD WITH POSITIVE AND NEGATIVE RETARDERS

[75] Inventors: Gang Xu, Northville; John A. VanderPloeg, Highland, both of Mich.

[73] Assignee: OIS Optical Imaging Systems, Inc., Northville, Mich.

[21] Appl. No.: 559,275

[22] Filed: Nov. 15, 1995

Related U.S. Application Data

[63] Continuation-in-part of Ser. No. 167,652, Dec. 15, 1993.
[51] Int. Cl.$^6$ ............................................. G02F 1/1335
[52] U.S. Cl. ........................................ 349/118; 349/120
[58] Field of Search .................................... 359/73

[56] References Cited

U.S. PATENT DOCUMENTS

| | | | |
|---|---|---|---|
| 4,889,412 | 12/1989 | Clerc et al. | 359/73 |
| 5,071,997 | 12/1991 | Harris | 528/353 |
| 5,138,474 | 8/1992 | Arakawa | 359/73 |
| 5,179,456 | 1/1993 | Aizawa et al. | 359/73 |
| 5,189,538 | 2/1993 | Arakawa | 359/73 |
| 5,213,852 | 5/1993 | Arakawa et al. | 428/1 |
| 5,291,323 | 3/1994 | Ohniski et al. | 359/73 |
| 5,344,916 | 9/1994 | Harris et al. | 359/73 |
| 5,406,396 | 4/1995 | Akatsuka et al. | 359/73 |
| 5,430,565 | 7/1995 | Yamanouchi et al. | 359/73 |
| 5,430,566 | 7/1995 | Sakaya et al. | 359/73 |
| 5,504,603 | 4/1996 | Winker et al. | 359/73 |
| 5,548,426 | 8/1996 | Miyashita et al. | 359/73 |
| 5,550,661 | 8/1996 | Clark et al. | 359/73 |

FOREIGN PATENT DOCUMENTS

| | | |
|---|---|---|
| 4-56802 | 2/1992 | Japan . |
| 4-97322 | 3/1992 | Japan . |
| 4311903 | 11/1992 | Japan . |
| 5257014 | 10/1993 | Japan . |
| 6-130227 | 5/1994 | Japan . |

*Primary Examiner*—Anita Pellman Gross
*Attorney, Agent, or Firm*—Myers Liniak & Berenato

[57] ABSTRACT

A normally white twisted nematic liquid crystal display is provided for outputting improved viewing characteristics which are defined by high contrast ratios and reduced inversion. The display includes both positive and negative retardation films, the negative films being defined by $n_x=n_y>n_z$ where the "z" direction is substantially perpendicular to the film plane and the "x" and "y" directions are substantially parallel to the film plane. According to certain embodiments, a pair of positive and a pair of negative retardation films are provided such that the two positive retarders sandwich both the liquid crystal layer and the negative retarders therebetween. By providing the positive and negative retarders with specific retardation values and/or ratios, improved viewing characteristics are provided.

16 Claims, 13 Drawing Sheets

NORMALLY WHITE TWISTED NEMATIC LCD WITH POSITIVE AND NEGATIVE RETARDERS

This application is a continuation-in-part (CIP) of Ser. No. 08/167,652, filed Dec. 15, 1993.

This invention relates to a normally white (NW) liquid crystal display (LCD) including positive and negative retardation films. More particularly, this invention relates to a NW twisted nematic LCD including positive and negative retardation films (birefringent films) of specific values and/or within a specific ratio range.

RELATED APPLICATIONS

This application relates to commonly owned U.S. Ser. Nos. 08/167,652, filed Dec. 15, 1993, 08/255,971, filed Jun. 8, 1994, and 08/235,691, filed Apr. 29, 1994, the disclosures of which are hereby incorporated herein by reference. Each of these copending commonly owned applications relates to a liquid crystal display with specific retarder values and/or positions.

BACKGROUND OF THE INVENTION

Informational data in typical liquid crystal displays (LCDs) is presented in the form of a matrix array of rows and columns of numerals or characters (i.e. pixels) which are generated by a number of segmented electrodes arranged in a matrix pattern. The segments are connected by individual leads to driving electronics which apply a voltage to the appropriate combination of segments and adjacent LC material in order to display the desired data and/or information by controlling the light transmitted through the liquid crystal material.

Contrast ratio is one of the most important attributes considered in determining the quality of both normally white (NW) and normally black (NB) liquid crystal displays. The contrast ratio in a normally white display is determined in low ambient conditions by dividing the "off-state" light transmission (high intensity white light) by the "on-state" or darkened transmitted intensity. For example, if the "off-state" transmission is 200 fL at a particular viewing angle and the "on-state" transmission is 5 fL at the same viewing angle, then the display's contrast ratio at that particular viewing angle is 40 or 40:1 for the particular "on-state" driving voltage utilized.

Accordingly, in normally white LCDs a significant factor adversely limiting the contrast ratio is the amount of light which leaks through the display in the darkened or "on-state." In a similar manner, in normally black displays, a significant factor limiting the contrast ratio achievable is the amount of light which leaks through the display in the darkened or "off-state." The higher and more uniform the contrast ratio of a particular display over a wide range of viewing angles, the better the LCD in most applications.

Normally black (NB) twisted nematic displays typically have better contrast ratio contour curves or characteristics then do their counterpart NW displays (i.e. the NB image can be seen better at large viewing angles). However, NB displays are much harder to manufacture than NW displays due to their high dependence on the cell gap or thickness "d" of the liquid crystal layer as well as on the temperature of the liquid crystal material itself. Accordingly, a long-felt need in the art has been the ability to construct a normally white display with high contrast ratios over a large range of viewing angles, rather than having to resort to the more difficult to manufacture NB displays to achieve these characteristics.

What is generally needed in NW displays is an optical compensating or retarding element(s), i.e. retardation film, which introduces a phase delay that restores the original polarization state of the light, thus allowing the light to be substantially blocked by the output polarizer in the "on-state." Optical compensating elements or retarders are known in the art and are disclosed, for example, in U.S. Pat. Nos. 5,184,236; 5,189,538; 5,406,396; 4,889,412; 5,344,916; 5,196,953; 5,138,474; and 5,071,997.

The disclosures of 08/255,971 and 08/167,652 (both incorporated herein by reference) in their respective "Background" sections illustrate and discuss contrast ratios and driving voltage versus intensity (fL) graphs of prior art NW displays, which are less than desirable. Prior art NW LCD viewing characteristics are problematic in that, for example, their contrast ratios are limited both horizontally and vertically (and often nonsymmetric), and their gray level performance lacks consistency.

Gray level performance and the corresponding amount of inversion are also important in determining the quality of an LCD. Conventional active matrix liquid crystal displays typically utilize anywhere from about 8 to 64 different driving voltages. These different driving voltages are generally referred to as "gray level" voltages. The intensity of light transmitted through the pixel(s) or display depends upon the driving voltage utilized. Accordingly, conventional gray level voltages are used to generate dissimilar shades of color so as to create different colors when, for example, the shades are mixed with one another.

Preferably, the higher the driving voltage in a normally white display, the lower the intensity (fL) of light transmitted therethrough. The opposite is true in normally black displays. Thus, by utilizing multiple gray level driving voltages, one can manipulate either a NW or NB liquid crystal display to emit desired intensities and shades of light/color. A gray level $V_{ON}$ is generally known as any driving voltage greater than $V_{th}$ (threshold voltage) up to about 5 to 6.5 volts.

Gray level intensity in an LCD is dependent upon the display's driving voltage. It is desirable in NW displays to have an intensity versus driving voltage curve wherein the intensity of light emitted from the display or pixel continually and monotonically decreases as the driving voltage increases. In other words, it is desirable to have gray level performance in a NW pixel such that the intensity (fL) at 6.0 volts is less than that at 5.0 volts, which is in turn less than that at 4.0 volts, which is less than that at 3.0 volts, which is in turn less than that at 2.0 volts, etc. Such desired gray level curves across a wide range of view allows the intensity of light reaching viewers at different viewing angles to be easily and consistently controlled.

Ser. Nos. 08/255,971 and 08/167,652 discuss, in their respective "Background" sections, prior art NW LCDs with inversion problems (e.g. inversion humps, specifically their transmission versus driving voltage graphs). As discussed therein, inversion humps are generally undesirable. A theoretically perfect driving voltage versus intensity (fL) curve for an NW display would have a decreased intensity (fL) for each increase in gray level driving voltage at all viewing angles. In contrast to this, inversion humps represent increase(s) in intensity of radiation emitted from the LCD or light valve for each corresponding increase in gray level driving voltage. Accordingly, it would satisfy a long-felt need in the art if a normally white TN liquid crystal display could be provided with no or little inversion and improved contrast ratios over a wide range of viewing angles.

U.S. Pat. No. 5,344,916 discloses a liquid crystal display including retardation films having positive and negative retardation films. The negative retarders (or birefringent films) of the '916 patent have as a characteristic that $n_x=n_y>n_z$, this equation defining the term "negative." The "Z" direction or axis is perpendicular to the plane of the film, while the "X" and "Y" axes are parallel to the retardation film plane. Thus, the optical axes of the negative retardation films in the '916 patent are perpendicular to the film plane. It is noted that $n_x$, $n_y$, and $n_z$ are the respective indices of refraction.

Unfortunately, while use of the negative retardation films of the '916 patent improves contrast over some prior art LCDs, twisted nematic (TN) displays including same often still suffer from less than desirable contrast ratios at large viewing angles. Pointedly, the disclosure of the '916 patent does not appreciate, suggest, or disclose the use of negative and positive retarders together at specified values, ratios, and/or locations to even further improve viewing characteristics of an LCD as discussed below by the instant inventors.

U.S. Pat. No. 5,189,538 (and 5,138,747) discloses a super twisted nematic (STN) LCD including films having different birefringent values. Unfortunately, STN LCDs have no real correspondence or correlation to ≈90° TN LCDs with regard to the behavior of the image due to retarders. In other words, teachings regarding retarders in STN devices (e.g. 270° twist) generally little or have no relevance with regard to TN (≈90° twist) LCDs.

U.S. Pat. No. 4,889,412 discloses a LCD with electrically controlled birefringence (ECB) and negative anisotropy. Unfortunately, ECB displays do not use twisted nematic LC material as does the instant invention. Again, ECB display teachings are generally unrelated to TN (≈90° twist) displays with regard to retardation teachings and principles.

U.S. Patent No. 5,291,323 discloses a liquid crystal display with "positive and negative compensating films each with its optical axis parallel to the surface." Unfortunately, the disclosure and teaching of the '323 patent are unrelated to TN displays such as those of the instant invention that the '323 patent relates to supertwisted (e.g. 240° twist) LCDs. It is also worth noting that the slow phase axis directions of certain phase plates in the '323 patent are parallel to the surface (i.e. plane defined by the layer).

The term "rear" when used herein but only as it is used to describe substrates, polarizers, electrodes, buffing zones, and orientation films means that the described element is on the backlight side of the liquid crystal material, or in other words, on the side of the LC material opposite the viewer.

The term "front" when used herein but only as it is used to describe substrates, polarizers, electrodes, buffing zones and orientation films means that the described element is located on the viewer side of the liquid crystal material.

The LCDs and light valves herein include a liquid crystal material with a birefringence (Δn) of 0.084 at room temperature, Model No. ZLI-4718 obtained from Merck, unless specified otherwise.

The term "retardation value" as used herein means "d·Δn" of the retardation film or plate, wherein "d" is the film thickness and "Δn" is the film birefringence.

The term "interior" when used herein to describe a surface or side of elements (or an element itself), means closest to the liquid crystal material.

The term "light valve" as used herein means a liquid crystal display including a rear linear polarizer, a rear transparent substrate, a rear continuous pixel electrode, a rear orientation film, an LC layer, a front orientation film, a front continuous pixel electrode, a front substrate, and a front polarizer (without the presence of color filters and driving active matrix circuitry such as TFTs). Such a light valve may also include a retardation film(s) disposed on either side of the LC layer as described with respect to each example and embodiment herein. In other words, a "light valve" may be referred to as one giant pixel without segmented electrodes.

It is apparent from the above that there exists a need in the art for a normally white liquid crystal display wherein the viewing zone of the display has both high contrast ratios and little or no inversion over a wide range of viewing angles.

This invention will now be described with respect to certain embodiments thereof, accompanied by certain illustrations wherein:

SUMMARY OF THE INVENTION

Generally speaking this invention fulfills the above-described needs in the art by providing a normally white twisted nematic liquid crystal display comprising:

a liquid crystal layer for twisting at least one normally incident visible wavelength of light from about 80° to 100° as it passes therethrough when the liquid crystal layer is in substantially the off-state thereby defining a twisted nematic display;

a pair of negative retarders sandwiching the liquid crystal layer therebetween;

a pair of positive retarders sandwiching both the liquid crystal layer and the negative retarders therebetween; and wherein the retardation value of each of the negative retarders is from about −60 to −200 nm and the retardation value of each of the positive retarders is from about 80 to 200 nm.

According to certain other embodiments of this invention, a method of making a twisted nematic LCD is provided comprising the steps of:

providing a pair of negative retarders defined by $n_x=n_y>n_z$ so that the optical axis of each of the negative retarder is substantially perpendicular to the planes defined by the negative retarders;

providing a pair of positive unaxial retarders;

disposing a twisted nematic liquid crystal layer between a pair of negative retarders and between the pair of positive retarders; and disposing the pair of negative retarders between the pair of positive retarders so that the resulting display output contrast ratios of at least about 20 at horizontal viewing angles along the 0° vertical axis of about ±40°.

This invention will now be described with respect to certain embodiments thereof, along with reference to the accompanying illustrations, wherein:

IN THE DRAWINGS

Figure 2:
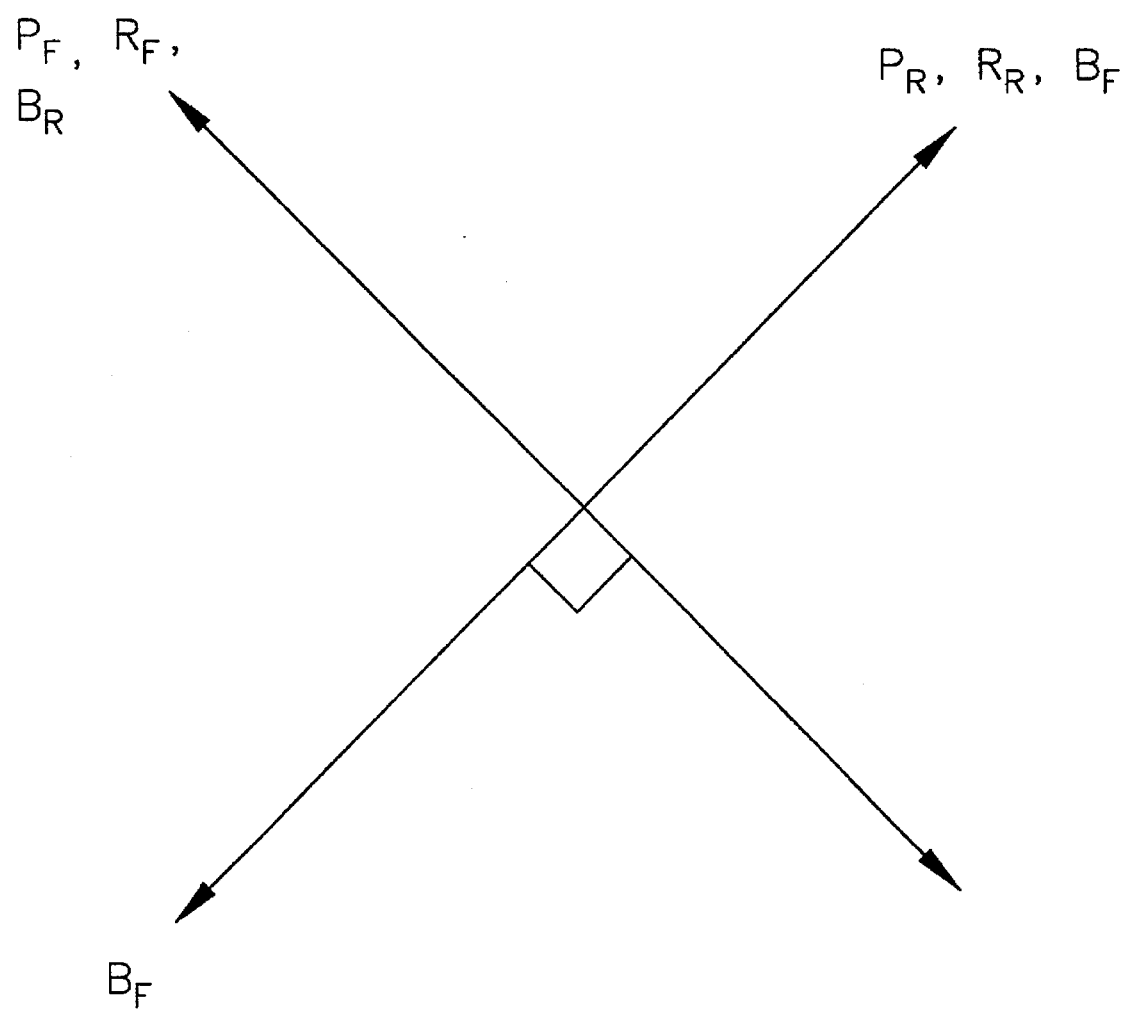
FIG. 2 illustrates the angular relationships between the respective optical axes of the FIG. 1 components according to a first embodiment of this invention.

FIG. 3 illustrates the angular relationships between the respective optical axes of the components of the FIG. 1 display according to a second embodiment of this invention, the second embodiment differing from the FIG. 2 embodiment in that the axes of the positive retarders are angled about 3° with respect to their adjacent polarizer transmission axes.

Figure 1:
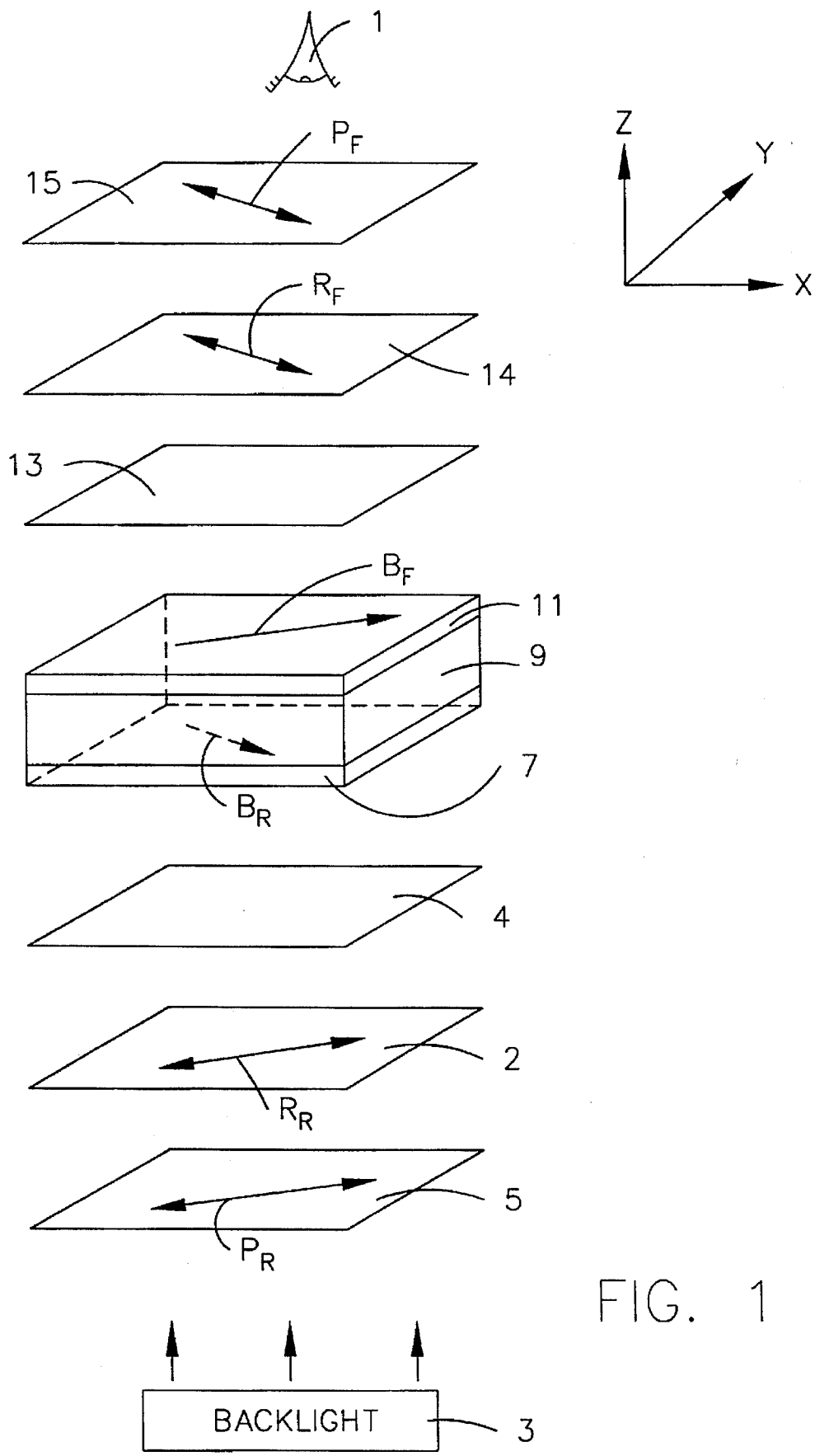
FIG. 1 is an exploded perspective view of the optical components of a normally white twisted nematic LCD according to an embodiment of this invention, the display including both a pair of negative retarders and a pair of positive retarders sandwiching a liquid crystal layer therebetween.
Figure 4:
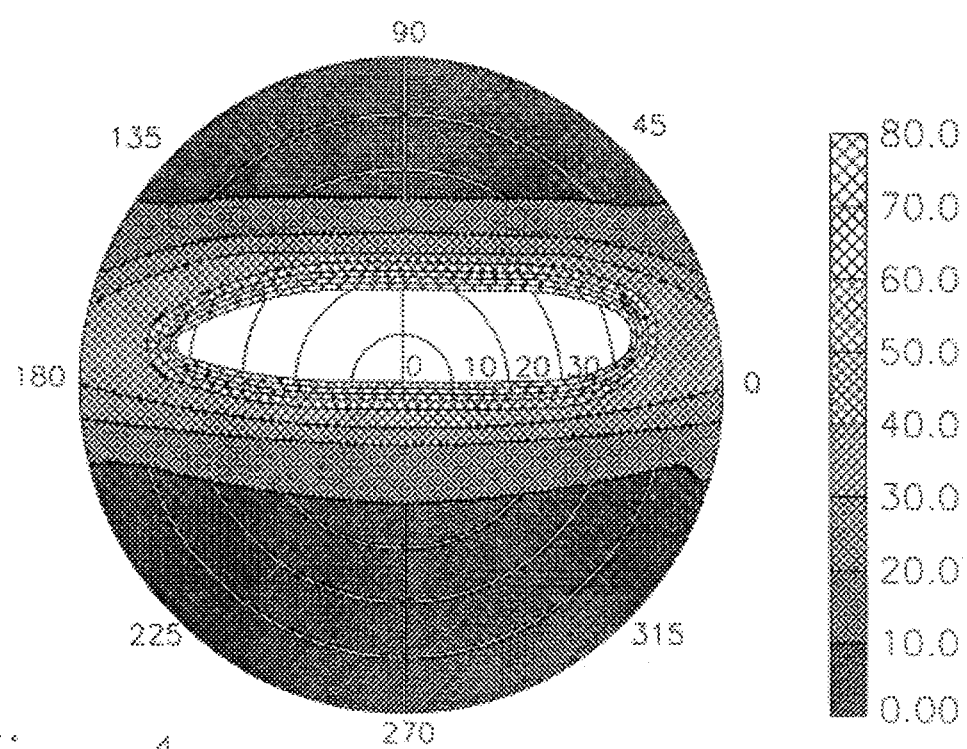

FIG. 4 is a white light contrast ratio contour graph or plot of the Example 1 twisted nematic normally white liquid crystal light valve when 5.0 driving volts was applied thereto according to the FIG. 1–2 embodiment of this invention.

Figure 5:
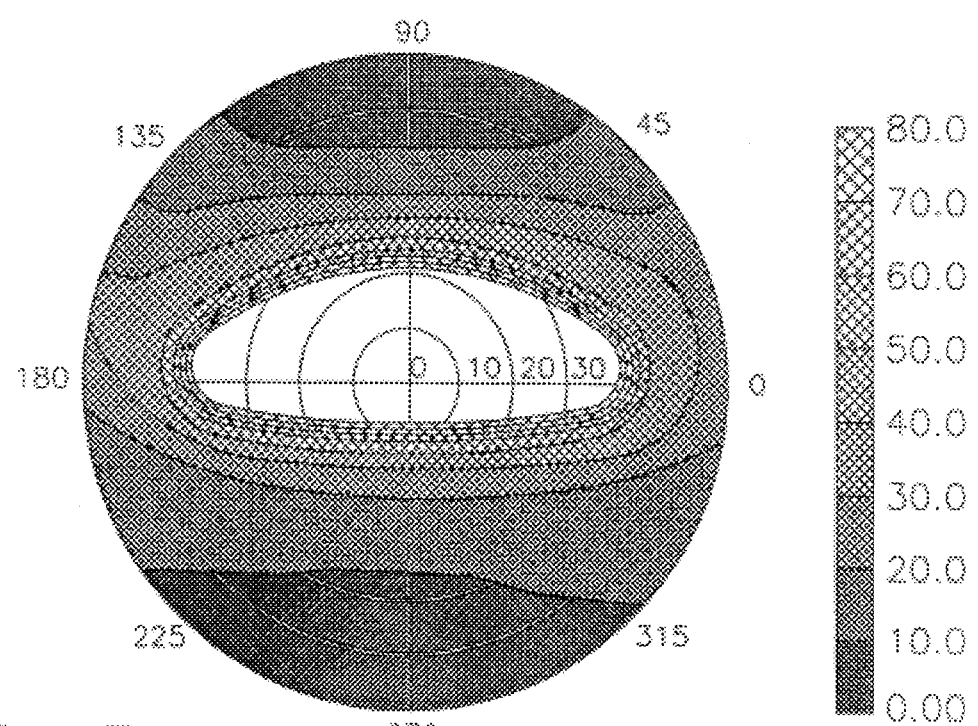

FIG. 5 is a white light contrast ratio contour graph of the FIG. 4 light valve when 7.0 driving volts was applied thereto.

Figure 3:
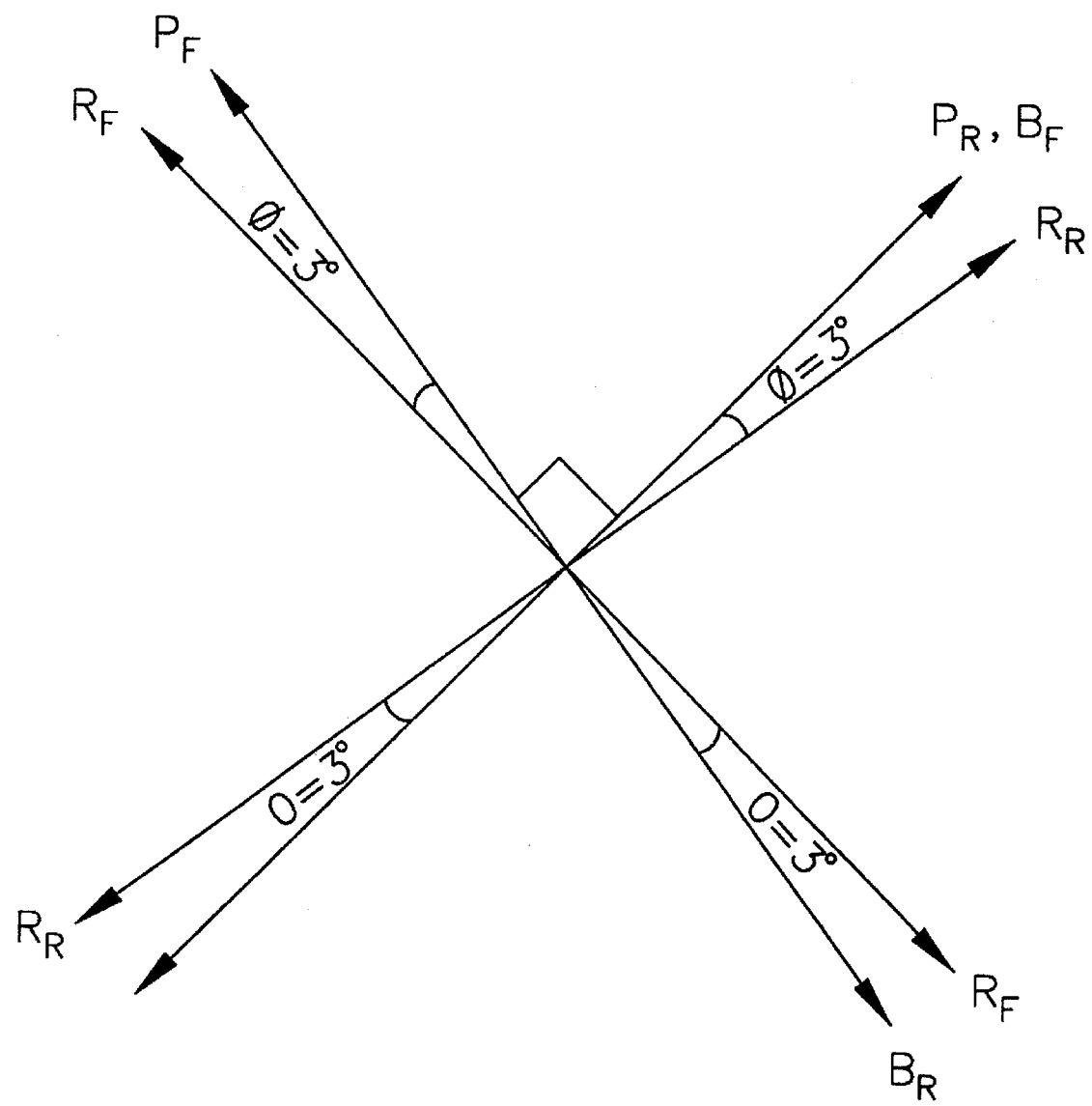
Figure 6:
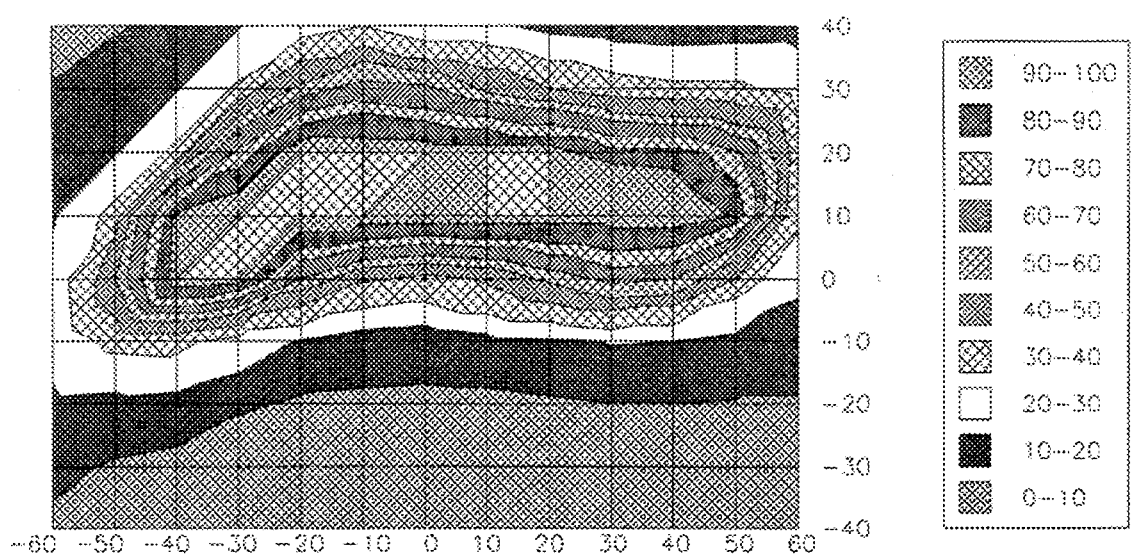

FIG. 6 is a white light contrast ratio contour graph of the Example 2 6"×8" AMLCD (normally white) according to the FIG. 3 embodiment of this invention when φ equals 3°, this FIG. 6 graph illustrating the display when 6.1 driving volts was applied thereto.

Figure 7:
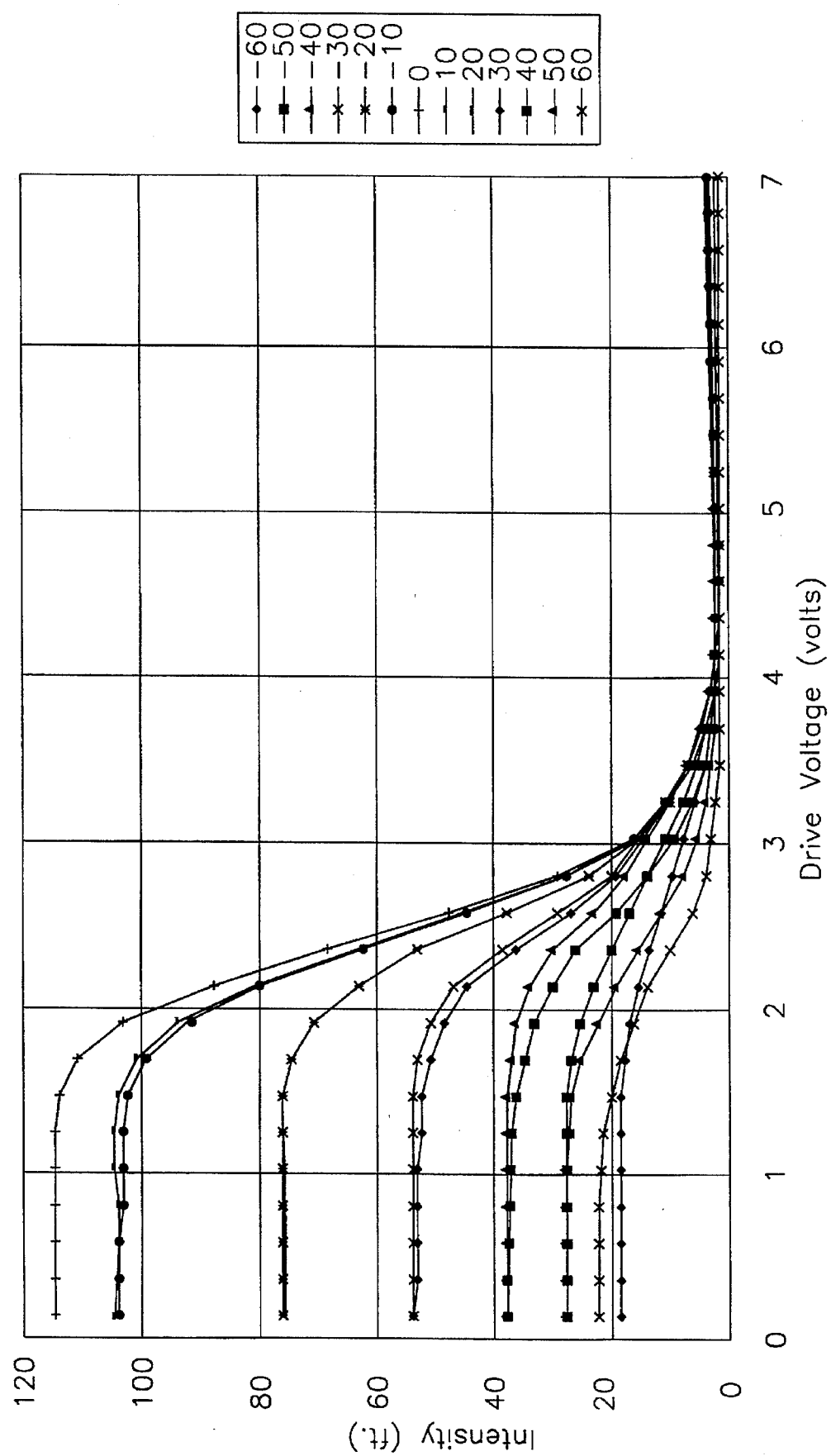

FIG. 7 is a transmission (intensity) versus driving voltage graph of the FIG. 6 normally white AMLCD, this graph showing the excellent gray level behavior of this display.

Figure 8:
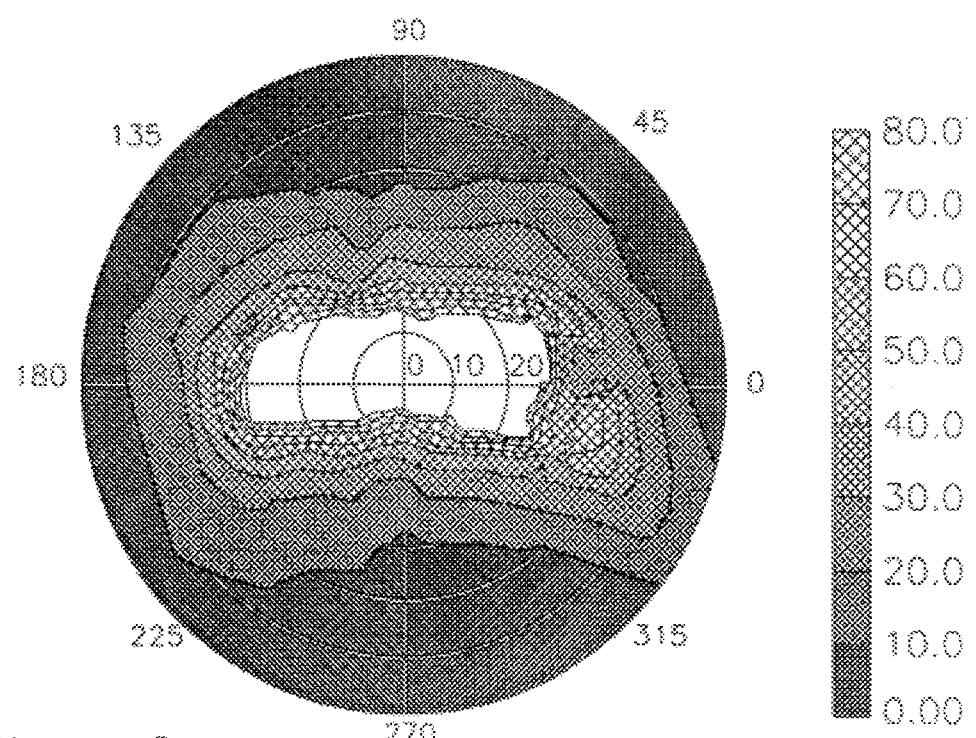

FIG. 8 is a white light contrast ratio contour graph of the Example 3 normally white light valve when 6 driving volts was applied thereto.

Figure 9:
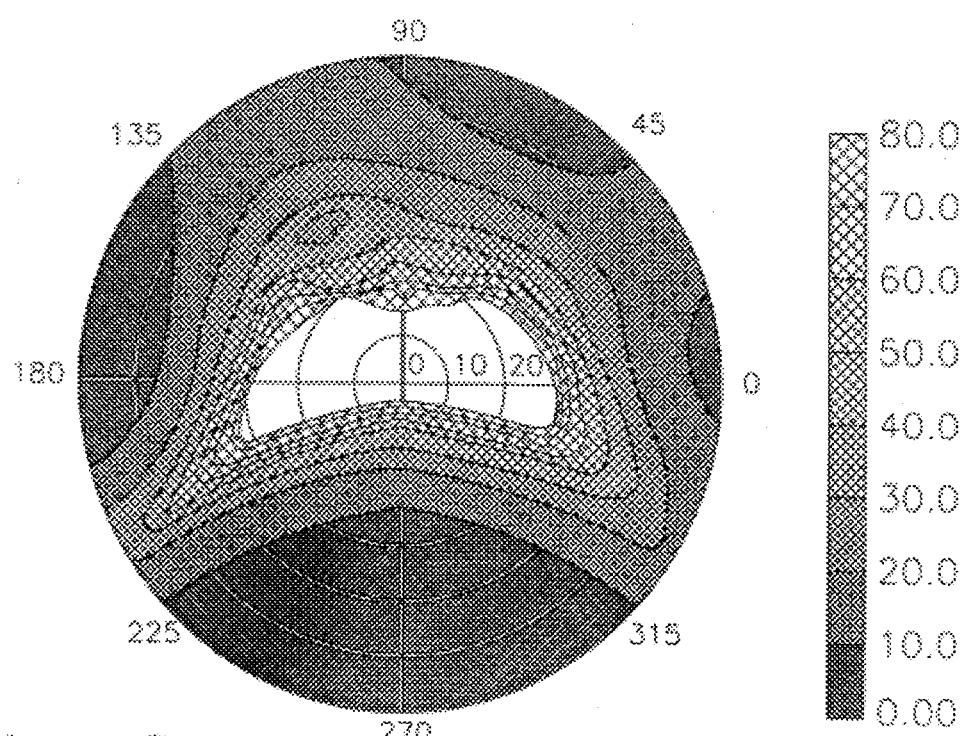

FIG. 9 is a white light contrast ratio contour graph of the Example 4 normally white light valve according to the FIGS. 1–2 embodiments when 6 driving volts was applied thereto.

Figure 10:
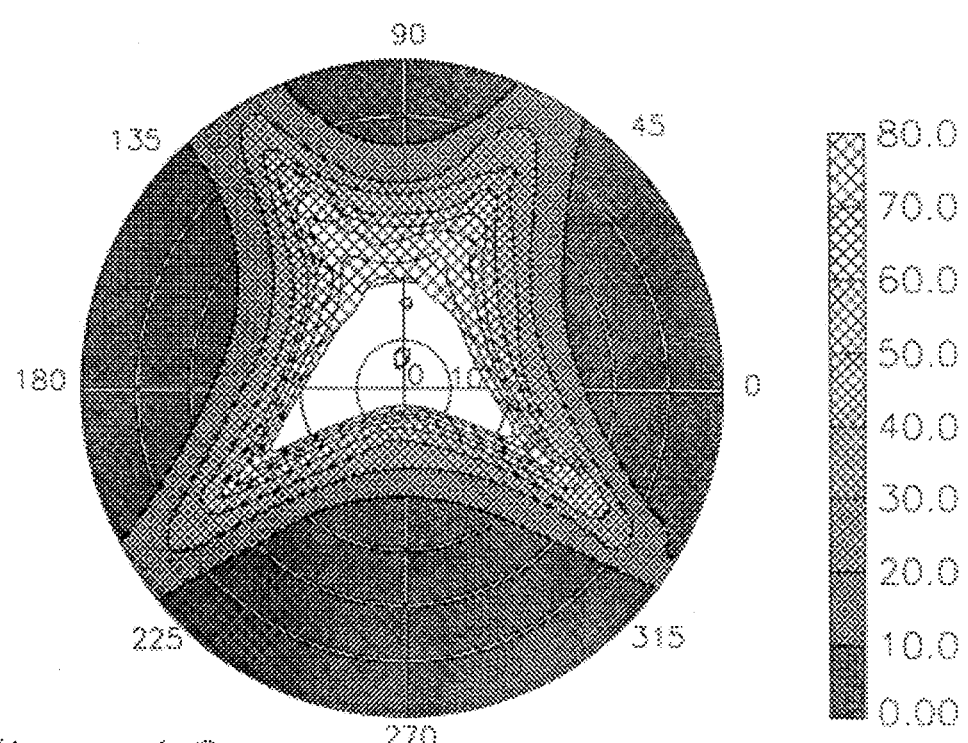

FIG. 10 is a white light contrast ratio contour graph of the Example 5 normally white light valve according to when six driving volts was applied thereto.

Figure 11:
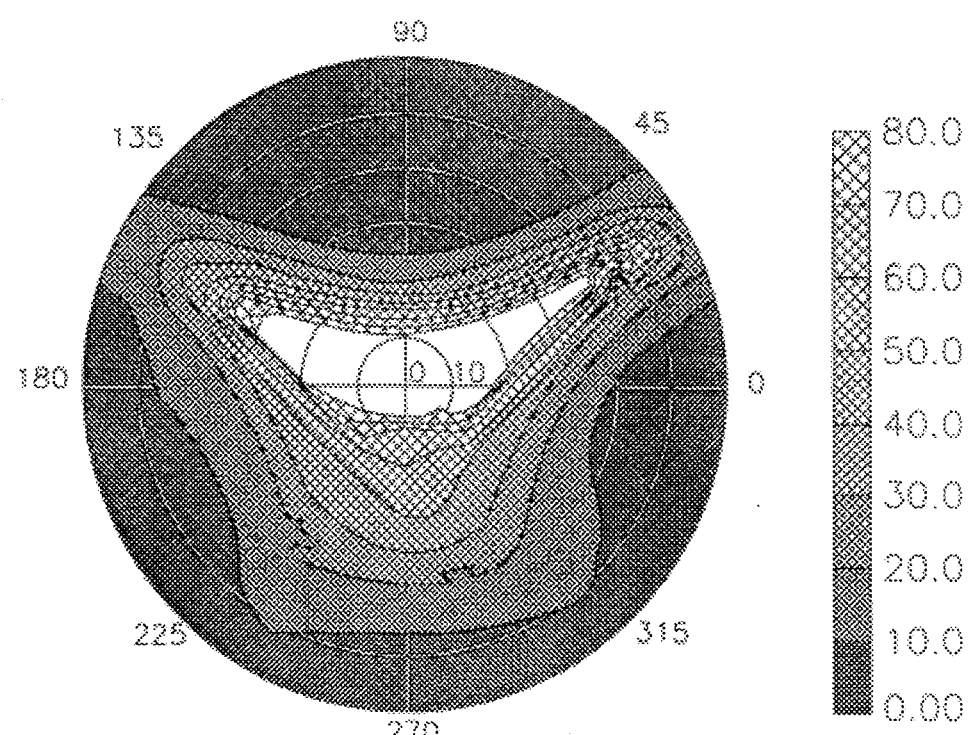

FIG. 11 is a white light contrast ratio contour graph of the Example 6 normally white light valve when 6 driving volts was applied thereto.

Figure 12:
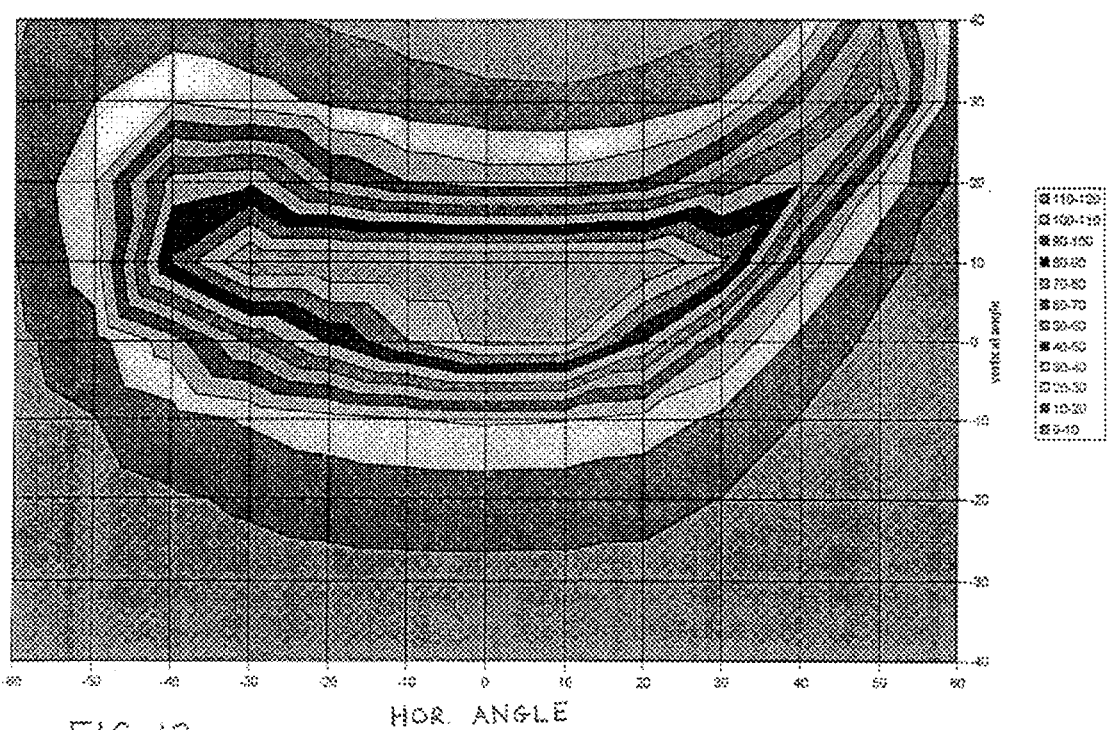

FIG. 12 is a white light contrast ratio contour graph of the Example 12 normally white AMLCD similar to that shown in FIGS. 1–2 except that positive and negative retarders are provided on only one side of the liquid crystal layer, this display including one positive retarder (140 nm) and one negative retarder (−110 nm) on the same side of the LC layer.

Figure 13:
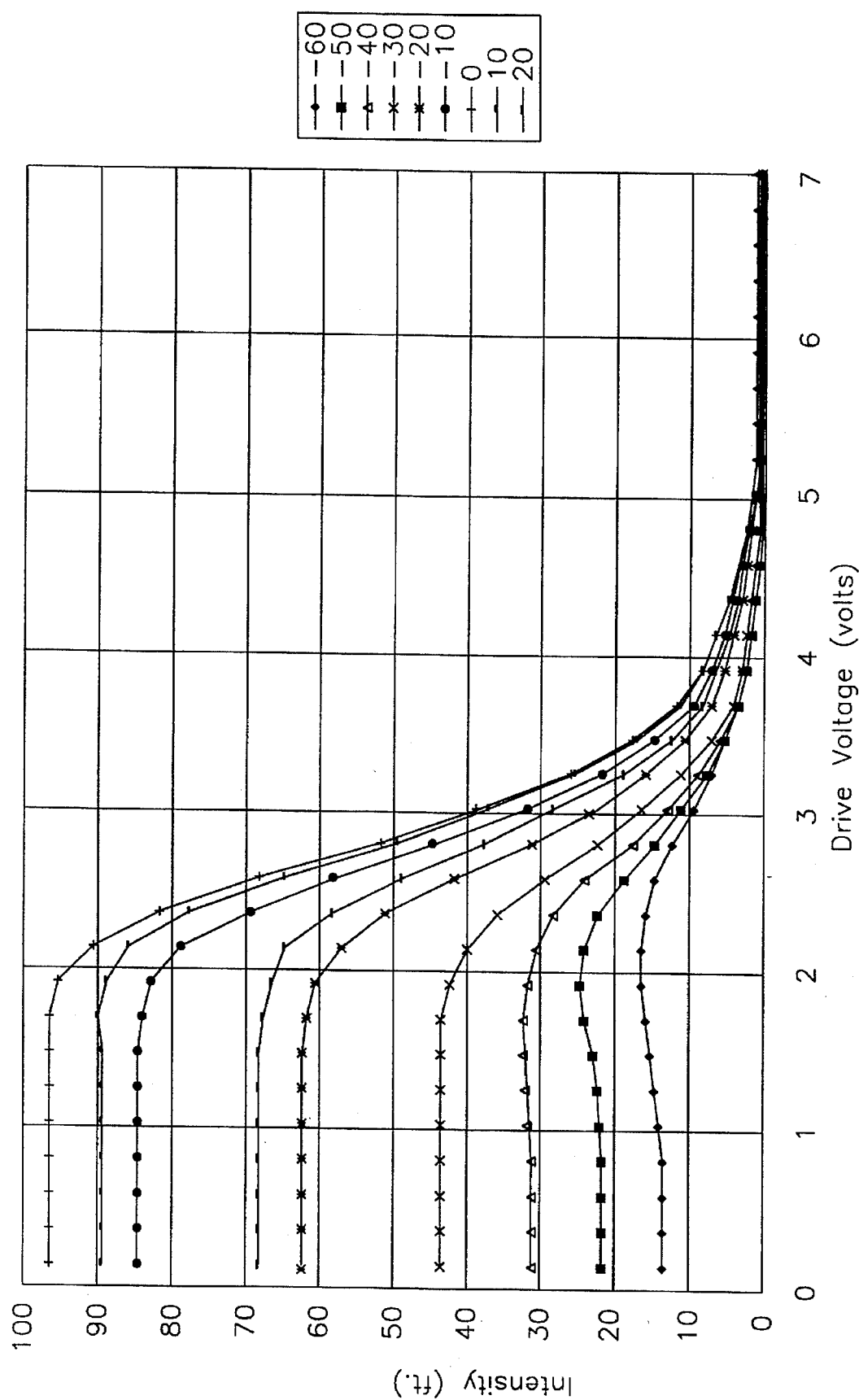

FIG. 13 is a transmission versus driving voltage plot or graph of the FIG. 12 AMLCD.

DETAILED DESCRIPTION OF CERTAIN EMBODIMENTS OF THIS INVENTION

FIG. 1 is an exploded schematic view of the optical components and their respective orientations of a twisted nematic NW LCD according to a first embodiment of this invention, the LCD being a light valve or an AMLCD having a matrix array of pixels and colored (i.e. RGB) subpixels in certain embodiments. As shown, this display includes from the rear forward toward viewer 1, conventional backlight 3, rear or light-entrance linear polarizer 5, rear positive uniaxial retardation film 2, rear negative retardation film 4, rear buffing or orientation film 7, liquid crystal layer 9, front buffing or orientation film 11, front negative retardation film 13, front positive uniaxial retardation film 14, and finally front or light-exit linear polarizer 15. Glass substrate (not shown) are located on either (i.e. both) side of layer 9 so as to be disposed between the respective orientation films and their adjacent negative retarders. Electrodes (not shown) are disposed between the substrates and their adjacent orientation layers. The key to this invention is the surprise finding that when the positive and negative retarders listed above are each within a particular retardation value(s) range and/or ratio, improved viewing characteristics of the display result.

Backlight 3 is conventional in nature and emits substantially collimated or alternatively diffused light toward the display panel. Backlight 3 may be, for example, the backlighting assembly disclosed in commonly owned U.S. Pat. No. 5,161,041, the disclosure of which is hereby incorporated herein by reference. Other conventional high intensity substantially collimated backlight assemblies may alternatively be used.

Rear and front polarizers 5 and 15 respectively are linear in nature in certain embodiments of this invention and their respective linear transmission axes $P_R$ and $P_F$ are orientated substantially perpendicular to one another so that the displays of the different embodiments are of the normally white (NW) type. Therefore, when a driving voltage (e.g. 0.1 V) below the threshold voltage $V_{th}$ is applied by electrodes (not shown) across liquid crystal layer 9, transmission axes $P_R$ and $P_F$ of polarizers 5 and 15 respectively are orientated such that the light emitted from backlight 3 proceeds through and is linearly polarized in direction $P_R$ by polarizer 5, is then twisted (e.g. from about 80° to 100°) by twisted nematic LC layer 9, and finally exits front polarizer 15 via transmission axis $P_F$ thus reaching viewer 1. The light reaches viewer 1 because its polarization direction upon reaching front polarizer 15 is similar to the direction defined by transmission axis $P_F$. Thus, a NW display or pixel to which a voltage less than $V_{th}$ is applied is said to be in the "off-state" and appears white (or colored if color filters are present) to the viewer. These polarizers are commercially available from, for example, Nitto Denko America, as #G1220DUN.

However, when a substantial driving voltage (e.g. about 6 volts) is applied across selected NW pixels of the matrix array including liquid crystal layer 9, the light transmitted through rear polarizer 5 is not significantly twisted by LC layer 9 and thus is substantially blocked by front polarizer 15 due to the fact that the polarization direction of light reaching the interior surface of front polarizer 15 is substantially perpendicular (or otherwise non-aligned) to transmission axis $P_F$ thereby resulting in substantially no light reaching viewer 1 by way of the selected pixel(s) to which the substantial driving voltage is applied. Thus, the selected pixels driven in the matrix array appear darkened to viewer 1, these pixels said to be in the "on-state". As will be appreciated by those of skill in the art, the amount of light reaching viewer 1 is dictated by the voltage applied to LC layer 9—the higher the driving voltage, the darker the selected driven pixel(s) appear.

In certain embodiments of this invention, transmission axis $P_R$ of rear polarizer 5 and transmission axis $P_F$ of front polarizer 15 are oriented in a manner substantially perpendicular to one another as shown in FIGS. 1–3 so as to define a normally white twisted nematic cell. However, polarizers 5 and 15 may be oriented in other conventional manners which also allow the cell or display to be of the normally white type.

Rear and front orientation or buffing films 7 and 11, respectively, are conventional and may be made of a substantially transparent polyimide. Rear orientation film 7 is conventionally buffed or oriented in direction $B_R$ as shown in FIGS. 1–3. Likewise, front film 11 is conventionally buffed in direction $B_F$. Buffing directions $B_R$ and $B_F$ are oriented substantially perpendicular to one another as shown in FIGS. 1–3 so as to allow the molecules of liquid crystal layer 9 when in the off or non-driven state to be twisted from about 80° to 100°, most preferably about 90°. The term "off-state" means that a voltage below the threshold voltage ($V_{th}$) is applied across LC layer 9.

Liquid crystal layer 9 has a thickness "d" of from about 4.5 to 6.0 μm according to certain embodiments, preferably about 5.5 μm. Layer 9 has a birefringent value Δn of from about 0.08 to 0.10, preferably from about 0.084 to 0.086.

The voltage applied across LC layer 9 determines the degree of twisting of the liquid crystal molecules and thus dictates the polarization direction of light emitted from the front or viewer side of layer 9. In turn, the polarization direction of light reaching polarizer 15 dictates the amount of light permitted to pass therethrough via axis $P_F$ and reach viewer 1 in that the closer aligned transmission axis $P_F$ and the polarization direction of light reaching polarizer 15, the more light which is allowed to pass and reach viewer 1. While the application of voltage $>V_{th}$ to layer 9 causes the LC molecule to substantially align vertically, the LC molecules never completely stand on end or become perfectly aligned in the vertical direction as is known in the art. This gives rise to the need for retardation (or birefringent) film(s).

Positively birefringent uniaxial retardation films 2 and 14 with optical axes $R_R$ and $R_F$ respectively in this first embodiment (FIGS. 1–2) are disposed on opposing sides of liquid crystal layer 9 thereby sandwiching layer 9 therebetween. Surprisingly, it has been found that the provision of the above-listed four retardation films (two positive and two negative) of particular retardation values and/or ratios reduces inversion and improves viewing zone contrast ratios at over a large range of viewing angles.

Retardation films 2 and 14 in certain embodiments of this invention are positively birefringent and uniaxial in nature, such films being obtained from, for example, Nitto Corporation, Japan, or Nitto Denko America, Incorporated, New Brunswick, N.J. as Model No. NRF-140 (140 nm retarder).

Negative retarders 4 and 13 are defined by the characteristic $n_x=n_y>n_z$, where $n_x$, $n_y$, and $n_z$ are indices of refraction and the "z" direction is substantially perpendicular to the film plane while the "x" and "y" directions are substantially parallel to the film plane as shown in FIG. 1. Negative retarders 4 and 13 may be obtained from Rockwell or the University of Akron and are described in U.S. Pat. Nos. 5,344,916 and 5,071,997, both of which are hereby incorporated herein by reference. According to certain embodiments, the positive and negative retarders, and the polarizers may be separate sheets, although they may be integrally formed or laminated together in other embodiments. Thus, films 2 and 4, for example, may be laminated together to form a single film having a positive retarding section and a negative retarding section.

With reference to FIG. 2, transmission axis $P_R$, optical axis $R_R$, and buffing direction $B_F$ are substantially parallel to one another in certain embodiments of this invention while rear buffing direction $B_R$, front polarizer transmission axis $P_F$, and optical axis $R_F$ are also substantially parallel to one another thereby causing the display to output substantially symmetrical viewing characteristics relative to the "normal" viewing angle. In such embodiments, axis $P_R$ and direction $B_R$ are substantially perpendicular to one another as are axis $P_F$ and direction $B_F$. A display having such an optical arrangement is said to be "X-buffed". The term "X-buffed" means that rear polarizer transmission axis $P_R$ is substantially perpendicular to rear buffing direction $B_R$ while front polarizer transmission axis $P_F$ is substantially perpendicular to front buffing direction $B_F$.

While the FIG. 2 optical embodiment of the FIG. 1 display illustrates front positive retarder optical axis $R_F$ being substantially parallel to front transmission axis $P_F$ and rear positive retarder axis $R_R$ being substantially parallel to rear polarizer transmission axis $P_R$, the positive retarder optical axes of retarders 2 and 14 may be angled from these positions as shown in the FIG. 3 embodiment. FIG. 3 illustrates an optical axis and directional configuration according to another (or second) embodiment of this invention corresponding to the FIG. 1 display. As shown in FIG. 3, φ equals 3°. This means that front positive retarder optical axis $R_F$ of retarder 14 is rotated 3° from axis $P_F$ in the counterclockwise direction (as viewed from the viewpoint of viewer 1), while rear positive retarder optical axis $R_R$ of retarder 2 is rotated 3° in the clockwise direction relative to rear polarizer transmission axis $P_R$. By angling the positive retardation axes of retarders 2 and 14 symmetrically in such a manner that φ equals 3°, the viewing zone of best contrast output by the display is shiftable in the vertical direction. This is of particular interest, for example, in avionic cockpit applications when the display's best viewing zone is needed, not at normal, but at a vertical viewing angle with respect thereto (e.g. an angle +20° vertical of normal). By adjusting the retarder axes ($R_R$ and $R_F$) so that φ equals 3° as shown in FIG. 3, the viewing zone of highest contrast is shifted in the positive vertical direction with respect to normal (e.g. see FIG. 6).

The optical axes $R_R$ and $R_F$ of positive retarders 2 and 14 may be angled either symmetrically or nonsymmetrically with respect to one another according to certain embodiments of this invention, depending on the desired viewing characteristics of the display. φ for each positive retarder optical axis may be adjusted (in the same direction), for example, from about 0° to 8° in either the positive or negative direction. More preferably, φ may be adjusted plus or minus about 3° to 8°, and most preferably about 3° to 5° in either direction. By adjusting φ for both (or alternatively only one) of the positive retarders as shown in FIG. 3, the position of the highest contrast viewing zone may be shifted vertically and the highest contrast areas (i.e. the "eyes") in the viewing zone may be spaced closer or further apart (this is particularly useful when not only the pilot, but also the co-pilot must view a display within a cockpit).

It has been found that by providing the positive and negative retarders of this invention with particular retardation or birefringent values and/or ratios, improved viewing characteristics (higher contrast ratios and/or less inversion) of a normally white twisted nematic display are achieved. According to certain embodiments of this invention, the retardation value of positive films 2 and 14 is from about 80 to 200 nm, more preferably from about 120 to 160 nm, and most preferably about 140 nm. In combination with these positive retarder values, it has been found that excellent results are achieved when the birefringent values (retardation values) of negative retardation films 4 and 13 are from about −60 to −200 nm, more preferably from about −80 to −150 nm, and most preferably about −110 nm. Thus, according to a preferred embodiment of this invention, both rear positive retarder 2 and front positive retarder 14 have retardation values of 140 nm while both rear negative retarder 4 and front negative retarder 13 each have a retardation value of −110 nm.

According to certain other embodiments, it has been found that improved viewing characteristics result when the retardation values of the positive and negative retarders are maintained within a particular ratio range. The ratio of the positive retardation value of each of positive retarders 2 and 14 to the negative retardation value of negative retarders 4 and 13 is from about 1:1 to 2:1. More preferably, the retardation value ratio for the positive retarders to the negative retarders is from about 1.2:1 to 1.5:1. The retardation values of each of the like (e.g. positive) retarders need not be identical, so long as the ratio range is met by both sets of positive:negative retardation values. The improved viewing characteristics resulting from maintaining the positive and negative retarder values within these ratios will be illustrated below with respect to FIGS. 4–13 and the numerous examples herein.

This invention will now be described with respect to certain examples as follows:

EXAMPLE 1

In this first Example, a normally white twisted nematic X-buffed light valve was made as shown in FIGS. 1–2. Liquid crystal layer 9 had a thickness of about 5.5 μm and a Δn value of about 0.084. Liquid crystal layer 9 twisted normally incident light about 90° when in the off-state. Positive uniaxial retarders 2 and 14 of this light valve each had a positive retardation value of 140 nm while negative retarders 4 and 13 each had a retardation value of −110 nm. The negative retarders 4 and 13 were located interior of the two positive retarders 2 and 14 as shown in FIG. 1. The optical axes were arranged as shown in FIG. 2 ("X-buffed") so that the front and rear polarizer transmission axes were substantially perpendicular to one another while $P_F$ was substantially parallel to $R_F$ and $B_R$. Front buffing direction $B_F$ was substantially parallel to $P_R$ and $R_R$ of polarizer 5 and positive uniaxial retarder 2 respectively. The indices of refraction of negative retarders 4 and 13 were defined so that $n_x=n_y>n_z$, as in all of the Examples herein. Thus, the optical axis of each negative retarder was substantially perpendicular to the plane of the retarder. The positive to negative retardation value of ratio on each side of LC layer 9 was 1.27 in this Example.

FIGS. 4 and 5 are white light contrast ratio graphs of the light valve made in this Example when 5.0 and 7.0 volts, respectively, were applied across LC layer 9. As in all Examples herein, LC layer 9 was substantially at room temperature or slightly higher (e.g. about 38°–40° C.). As shown in FIG. 4 when 5.0 driving volts was applied to the light valve, excellent contrast ratios were achieved over a wide range of viewing angles, the 80:1 or 80 contour line extending horizontally at least about ±40°. Then, in FIG. 5, when 7.0 driving volts was applied to the light valve, the 80:1 and greater contrast ratio viewing zone expanded vertically and slightly contracted horizontally. As can be seen in FIG. 5, the 80:1 or 80 contrast ratio viewing zone extended horizontally along the 0° vertical viewing axis to about ±37° to 38°. Likewise, the 10:1 contrast ratio viewing zone extended horizontally along the 0° vertical viewing axis across the entire graph and vertically along the 0° horizontal viewing axis to about +45° and −35°. The viewing characteristics illustrated in FIGS. 4–5 for this light valve are superior to the prior art as a result of the retardation values provided for the positive and negative retarders and their locations in the display stack.

EXAMPLE 2

A 6"×8" TFT driven X-buffed active matrix liquid crystal display (AMLCD) as shown in FIGS. 1 and 3 with RGB color filters was made and analyzed in this Example. The AMLCD of this Example had a substantially common TN liquid crystal material 9 thickness of about 5.2 μm across the entire display panel. Liquid crystal layer 9 had a Δn of about 0.084. Positive retardation films 2 and 14 sandwiching LC layer 9 therebetween in this Example (as in the other Examples herein) each had a retardation value of 140 nm while negative retardation films 4 and 13 surrounding layer 9 each had a retardation value of −110 nm. Thus, the positive to negative retardation value ratio was 1.27 on both sides of layer 9. The optical axes and directions of this AMLCD were provided as shown in FIG. 3 so that φ equalled positive 3°. Thus, front polarizer transmission axis $P_F$ was substantially parallel to rear buffing direction $B_R$, these directions being angled about 3° from front positive retarder optical axis $R_F$ as shown in FIG. 3. Likewise, rear polarizer transmission axis $P_R$ was substantially perpendicular to front transmission axis $P_F$, with rear transmission axis $P_R$ being substantially parallel to front buffing direction $B_F$ and angled about 3° from $R_R$ as shown in FIG. 3.

FIG. 6 is a white light contrast ratio graph of the AMLCD of this Example when 6.1 volts was applied thereto. As can be seen in FIG. 6, the high contrast viewing region was shifted vertically upward due to the adjustment of φ to a value of 3° on each side of LC layer 9. The 90 to 100 contrast ratio area extended horizontally along the +10° vertical axis from about −40° to +48°, this being a marked improvement over the prior art. Additionally, the two high contrast (eye) regions in the center of the high contrast area define contrast ratios up to and including about 240:1 or 240. These two "eyes" can be made into one or alternatively spaced further apart by increasing and decreasing φ (move retarder axis or axes) and/or rotating the polarizer axes by themselves symmetrically (symmetrically on both sides of LC layer 9).

FIG. 7 is a transmission (intensity) versus driving voltage graph for the AMLCD of this Example. The FIG. 7 graph illustrates the lack of inversion and superior gray level behavior of this TFT driven display.

EXAMPLE 3

In this Example, a normally white twisted nematic X-buffed light valve was made and analyzed (see FIG. 8). This light valve was made up as shown in FIGS. 1–2 so that φ equalled 0° on both sides of LC layer 9. Liquid crystal layer 9 had a thickness of about 5.5 μm. Positive retardation films 2 and 14 each had a positive retardation value of 300 nm. Negative retarders 4 and 13 each had a retardation value of −220 nm. As shown in FIG. 1, both a positive and negative retarder was positioned on each side of liquid crystal layer 9, with the negative retarder on each side being sandwiched between the adjacent positive retarder and the liquid crystal layer. The positive to negative retardation value ratio was 1.364 on each side of the panel for this Example.

FIG. 8 is a white light contrast ratio graph of the light valve of this Example when about 6 volts was applied thereto. As can be seen, the above 80:1 contrast ratio area (i.e. the white area in the center of the graph) extended horizontally along the 0° vertical axis from about −30° to +26°. Likewise, the above 30:1 contrast ratio viewing zone extended horizontally along the 0° vertical viewing axis from about −40° to +40°. These are significant improvements over the prior art. The contrast ratios output by this light valve are also expanded in the vertical direction relative to certain prior art displays. Because the positive retarders 2 and 14 in this light valve each had retardation values of 300 nm and the negative retarders 4 and 13 each had retardation values of −220 nm, the positive to negative retardation value ratio for this Example was 1.364 on each side of the light valve.

EXAMPLE 4

In this Example, a normally white twisted nematic light valve was manufactured and analyzed as shown in FIG. 9.

As in each of the Examples herein, liquid crystal layer 9 twisted normally incident light about 90° when in the off-state. This X-buffed light valve was made up as shown in FIGS. 1–2. Liquid crystal layer 9 had a thickness of about 5.5 μm. Positive retarders 2 and 14 each had a retardation value of 430 nm. Negative retarders 4 and 13 each had a retardation value of –220 nm. Thus, the positive to negative retardation value ratio for this Example was 1.95 on each side of layer 9. φ was 0°.

FIG. 9 is a white light contrast ratio graph showing the output to viewer 1 of the light valve of this Example when about 6 volts was applied thereto. While the output as shown in FIG. 9 was not quite as symmetrical as that of the previous Example (see FIG. 8), it still produced satisfactory results. The acceptable contrast ratio area extended well into the positive vertical region, however, the negative vertical region contrast ratios were less than desirable depending upon the application in which the light valve is to be used.

EXAMPLE 5

The light valve manufactured and analyzed in this Example is used as a comparison to the previous Examples for the purpose of illustrating the characteristics of an unacceptable contrast ratio output. The X-buffed light valve according to this Example was made as shown in FIGS. 1–2 (φ=0°). Liquid crystal layer 9 provided about a 90° twist and was about 5.5 μm thick. Positive retarders 2 and 14 on either side of layer 9 each had a retardation value of 430 nm while negative retarders 4 and 13 each had a retardation value of 110 nm. Thus, the positive to negative retardation value ratio in this Example was 3.91 on each side of LC layer 9.

FIG. 10 is a white light contrast ratio graph of the output of this light valve when about 6 volts was applied thereto. By comparing the FIG. 10 graph to the graphs of FIGS. 4–8, it can be seen that the light valve manufactured in this Example output less than desirable viewing characteristics when about 6 volts was applied thereto. For example, the above 80:1 contrast ratio viewing area is much smaller than in the previous Examples as are many of the other defined contrast ratio regions. In accordance with the spirit of this invention, the output of this light valve given the rather high positive/negative retardation value ratio of 3.91 is less than desirable.

EXAMPLE 6

As with the previous Example, the light valve manufactured and analyzed in this Example is generally undesirable. This light valve was manufactured as shown in FIGS. 1–2 so that φ equalled 0°. Liquid crystal layer 9 was 5.5 μm thick. As with all of the previous Examples, this light valve was "X-buffed". Positive uniaxial retarders 2 and 14 of this light valve each had a retardation value of 140 nm, while negative retarders 4 and 13 each had a retardation value of –220 nm. Again, this normally white twisted nematic light valve had an LC layer 9 which twisted normally incident light about 90° when in the off-state.

FIG. 11 is a white light contrast ratio graph of the output of this light valve when about 6.0 volts was applied thereto. By comparing the output of this light valve with those of the previous Examples, it can be seen that the FIG. 11 viewing characteristics are less than desirable and non-symmetric in view of the rather low positive/negative retardation value ratio of 0.64 on both sides of LC layer 9 in this Example.

EXAMPLE 7

Unlike each of the previous Examples, a color (RGB) 6"×8" AMLCD (X-buffed) was manufactured and analyzed in this Example as shown in FIGS. 1–2 (φ=0°) except that positive and negative retardation films were provided only on one side of LC layer 9. Thus, this AMLCD is illustrated by the optical components shown in FIG. 1 simply by removing rear films 2 and 4. Thus, the sole negative retardation film 13 having a birefringent value of –110 nm was located between liquid crystal layer 9 and the sole positive retardation film 14 which had a retardation value of 140 nm. With respect to the single positive and negative retarders of this Example, the positive to negative retardation value ratio was about 1.27 on the front side of LC layer 9.

FIG. 12 is a white light contrast ratio graph of the normally white twisted nematic AMLCD of this Example when about 7 volts was applied thereto. As can be seen, the high contrast viewing zone has been shifted vertically upward relative to the previously satisfactory Examples because positive and negative retarders were utilized on only one side of LC layer 9. Such a display output may be advantageous in certain applications such as cockpit applications where the display is positioned below the pilot's line of view.

FIG. 13 is a transmission versus driving voltage plot at horizontal viewing angles along the 0° vertical viewing axis of the AMLCD of this Example illustrating the lack of inversion humps and superior and improved gray level behavior of this display. This concludes all Examples herein.

Once given the above disclosure, many other features, modifications, and improvements will become apparent to the skilled artisan. Such other features, modifications, and improvements are therefore considered to be a part of this invention, the scope of which is to be determined by the following claims.

We claim:

1. A normally white twisted nematic liquid crystal display comprising:

a liquid crystal layer for twisting at least one normally incident visible wavelength of light from about 80° to 100° as it passes therethrough when said liquid crystal layer is in substantially the off-state thereby defining a twisted nematic display;

a pair of negative retarders sandwiching said liquid crystal layer therebetween;

a pair of positive retarders sandwiching both said liquid crystal layer and said negative retarders therebetween; and wherein the retardation value of each of said negative retarders is from about –60 to –200 nm and the retardation value of each of said positive retarders is from about 80 to 200 nm.

2. The display of claim 1, wherein the retardation value of each of said negative retarders is from about –80 to –150 nm.

3. The display of claim 1, wherein $n_x=n_y>n_z$ where $n_x$, $n_y$, and $n_z$ are indices of refraction and the "z" direction is substantially perpendicular to the planes defined by said negative retarders and the "x" and "y" directions are substantially parallel to the planes defined by said negative retarders for said negative retarders so that the optical axis of each of the negative retarders is substantially perpendicular to the planes of the retarders, whereby the optical axis of each said negative retarder is substantially perpendicular to the optical axis of each said positive retarder.

4. The display of claim 3, wherein the retardation value of each of said negative retarders is from about –100 to –120 nm.

5. The display of claim 4, wherein the retardation value of each of said positive retarders is from about 120 to 160 nm.

6. The display of claim 1, wherein the thickness of said liquid crystal layer is from about 4.8 to 6.0 μm and the birefringence Δn of said liquid crystal is from about 0.075 to 0.095 at room temperature, and wherein the display outputs contrast ratios to the viewer of at least about 20:1 or 20 at horizontal viewing angles along the 0° vertical viewing axis of about ±60° when a driving voltage of from about 6.0 to 6.1 volts is applied to said liquid crystal layer.

7. The display of claim 6, wherein said display outputs contrast ratios of at least about 30:1 or 30 at horizontal viewing angles along the 0° vertical viewing axis of about ±50°, and of at least about 20:1 or 20 at vertical viewing angles along the 0° horizontal viewing axis of about 0° to +40° when said 6.0 to 6.1 driving voltage is applied.

8. The display of claim 6, wherein a buffing direction on a front side of the liquid crystal layer is substantially parallel to both a rear polarizer transmission axis and the optical axis of the rear positive retarder.

9. A normally white twisted nematic liquid crystal display comprising:

a liquid crystal layer for twisting at least one normally incident visible wavelength of light from about 80° to 100° as it passes therethrough when said liquid crystal layer is in substantially the off-state thereby defining a twisted nematic display;

a pair of negative retarders sandwiching said liquid crystal layer therebetween;

a pair of positive retarders sandwiching said liquid crystal layer therebetween; and wherein the ratio of the positive retardation value to the absolute value of the negative negative retardation value on each side of said liquid crystal layer is from about 1:1 to 2:1.

10. The display of claim 9, wherein said ratio is from about 1.2:1 to 1.5:1, and the negative retarders are defined by the characteristic $n_x=n_y>n_z$ where $n_x$, $n_y$, and $n_z$ are indices of refraction and the "z" direction is substantially perpendicular to the planes defined by said negative retarders and the "x" and "y" directions are substantially parallel to the planes defined by said negative retarders, whereby the optical axes of said negative retarders are substantially perpendicular to said planes defined by said negative retarders.

11. The display of claim 10, wherein the retardation value of each of said negative retarders is from about −80 to −140 nm and the retardation value of each of said positive retarders is from about 100 to 200 nm.

12. A method of making a twisted nematic liquid crystal display comprising the steps of:

providing a pair of negative retarders defined by $n_x=n_y>n_z$ where $n_x$, $n_y$, and $n_z$ are indices of refraction and the "z" direction is substantially perpendicular to the planes defined by said negative retarders and the "x" and "y" directions are substantially parallel to the planes defined by said negative retarders so that the optical axis of each of said negative retarders is substantially perpendicular to the planes defined by the negative retarders;

providing a pair of positive uniaxial retarders;

disposing a twisted nematic liquid crystal layer between said pair of negative retarders and between said pair of positive retarders; and disposing said pair of negative retarders between said pair of positive retarders so that the resulting display outputs contrast ratios of at least about 20:1 or 20 at horizontal viewing angles along the 0° vertical viewing axis of about ±40°.

13. The method of claim 12, further comprising the step of providing retardation values for said retarders so that the display outputs contrast ratios of at least about 80:1 or 80 at horizontal viewing angles along the 0° vertical viewing axis of about ±30°.

14. The display of claim 13, further comprising the steps of providing each of said negative retarders with a retardation value of from about −60 to −200 nm and each of said positive retarders with a retardation value of from about 80 to 200 nm.

15. The method of claim 14, further comprising the steps of arranging optical axes of said positive retarders so that the optical axis of each said positive retarder is angled from the transmission axis of the adjacent polarizer from about 0° to 8° so as to adjust the position of the high contrast viewing zone output by the display.

16. A twisted nematic liquid crystal display comprising:

a twisted nematic liquid crystal layer for twisting at least one visible wavelength of normally incident light from about 80° to 100° when in the off-state;

a positive retarder having a retardation value of from about 80 to 200 nm; and a negative retarder defined by $n_x=n_y>n_z$ where $n_x$, $n_y$, and $n_z$ are indices of refraction and the "z" direction is substantially perpendicular to the plane defined by said negative retarder and the "x" and "y" directions are substantially parallel to the plane defined by said negative retarder, and having a retardation value of from about −60 to −200 nm, said negative retarder disposed between said liquid crystal layer and said positive retarder.

* * * * *